United States Patent
Hong

(10) Patent No.: US 12,058,576 B2
(45) Date of Patent: Aug. 6, 2024

(54) CELL RESELECTION METHODS AND APPARATUSES

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 384 days.

(21) Appl. No.: 17/617,287

(22) PCT Filed: Jun. 11, 2019

(86) PCT No.: PCT/CN2019/090689
§ 371 (c)(1),
(2) Date: Dec. 7, 2021

(87) PCT Pub. No.: WO2020/248120
PCT Pub. Date: Dec. 17, 2020

(65) Prior Publication Data
US 2022/0232442 A1      Jul. 21, 2022

(51) Int. Cl.
*H04W 36/08* (2009.01)
*H04W 8/20* (2009.01)
*H04W 36/36* (2009.01)

(52) U.S. Cl.
CPC ............ *H04W 36/08* (2013.01); *H04W 8/20* (2013.01); *H04W 36/36* (2013.01)

(58) Field of Classification Search
None
See application file for complete search history.

(56) References Cited

U.S. PATENT DOCUMENTS

| 8,805,444 B2 | 8/2014 | Han et al. |
| 9,020,501 B2 | 4/2015 | Sun et al. |
| 9,730,149 B2 | 8/2017 | Feng et al. |

(Continued)

FOREIGN PATENT DOCUMENTS

| CN | 101217743 A | 7/2008 |
| CN | 102202363 A | 9/2011 |

(Continued)

OTHER PUBLICATIONS

International Search Report of the International Application No. PCT/CN2019/090689 dated Mar. 11, 2020 with English translation, (5p).

(Continued)

*Primary Examiner* — Charles N Appiah
*Assistant Examiner* — Frank E Donado
(74) *Attorney, Agent, or Firm* — Arch & Lake LLP; Zhangyuan Ji; Hao Tan

(57) ABSTRACT

A method is applicable to a terminal supporting a plurality of subscriber identification module (SIM) cards. The method includes that the terminal performs a cell reselection through a first SIM card among a plurality of SIM cards to obtain a cell reselection result. Additionally, the terminal sends the cell reselection result from the first SIM card to a second SIM card among the plurality of SIM cards. Furthermore, the terminal takes a cell indicated by the cell reselection result as a new cell in which the second SIM card is to reside.

5 Claims, 6 Drawing Sheets

(56) References Cited

U.S. PATENT DOCUMENTS

| | | | |
|---|---|---|---|
| 2011/0314374 A1* | 12/2011 | Chae | H04M 1/72403 |
| | | | 455/418 |
| 2012/0021726 A1* | 1/2012 | Fu | H04W 8/205 |
| | | | 455/412.1 |
| 2012/0077494 A1 | 3/2012 | Kim et al. | |
| 2013/0157662 A1 | 6/2013 | Han et al. | |
| 2014/0248872 A1 | 9/2014 | Sun et al. | |
| 2015/0264640 A1 | 9/2015 | Feng et al. | |
| 2016/0112578 A1* | 4/2016 | Yang | H04M 15/7556 |
| | | | 455/432.1 |
| 2016/0302114 A1* | 10/2016 | Jain | H04B 1/3816 |
| 2016/0353516 A1* | 12/2016 | Rajurkar | H04W 8/183 |
| 2017/0094500 A1* | 3/2017 | Zhong | H04B 1/3816 |
| 2018/0124868 A1* | 5/2018 | Gupta | H04W 52/0245 |
| 2021/0282103 A1* | 9/2021 | Zhu | H04W 76/15 |

FOREIGN PATENT DOCUMENTS

| | | |
|---|---|---|
| CN | 102421088 A | 4/2012 |
| CN | 102934513 A | 2/2013 |
| CN | 103004282 A | 3/2013 |
| CN | 104796963 A | 7/2015 |
| CN | 104918300 A | 9/2015 |
| CN | 109429302 A | 3/2019 |
| WO | 2012109830 A1 | 8/2012 |
| WO | 2013010330 A1 | 1/2013 |
| WO | 2018176689 A1 | 10/2018 |

OTHER PUBLICATIONS

State Intellectual Property Office of the People's Republic of China, First Office Action and Search Report Issued in Application No. 201980001030.5, Jan. 11, 2021 with English translation (13p).

State Intellectual Property Office of the People's Republic of China, Second Office Action and Search Report Issued in Application No. 201980001030.5, Aug. 4, 2021 with English translation (14p).

* cited by examiner

CELL RESELECTION METHODS AND APPARATUSES

CROSS-REFERENCE TO RELATED APPLICATION

This application is the U.S. national phase application of International Application No. PCT/CN2019/090689, filed on Jun. 11, 2019, the disclosure of which is incorporated herein by reference in its entirety for all purposes.

TECHNICAL FIELD

The present disclosure relates to the field of communications, and in particular, relates to cell reselection methods and apparatuses.

BACKGROUND

Currently, more and more terminals support multiple Subscriber Identification Module (SIM) cards. A typical application scenario is shown below.

A business user has one private SIM card and one business SIM card, both of which are placed on one terminal. Alternatively, an ordinary user has a plurality of private SIM cards and selects to use one of them according to a service.

A plurality of SIM cards supported by one terminal may be from one operator or from different operators.

Taking a dual-card dual-standby terminal as an example, the terminal generally applies for two International Mobile Equipment Identity (IMEI) numbers, each of which corresponds to an International Mobile Subscriber Identification Number (IMSI). The reason is that due to a network-side identity verification to be performed as the terminal resides on a network, it brings confusion of the core network if two SIM cards of the dual-card terminal use the same IMEI, which may cause the identity verification failed, thereby eventually leading to a failure residence of the terminal.

Sometimes, the plurality of SIM cards of the terminal have to undergo separate cell reselections because different SIM cards are regarded on the network side as different terminals. During the cell reselection, the terminal measures signal strengths of multiple neighboring cells and make a reselection according to rules set by a base station. Such processes will consume the terminal's power if each SIM card of the terminal performs the cell reselection separately.

SUMMARY

In view of the above, embodiments of the present disclosure provide a cell reselection method and a cell reselection apparatus.

According to a first aspect of the present disclosure, there is provided a cell reselection method. The method is applicable to a terminal supporting a plurality of subscriber identification module (SIM) cards, and includes that the terminal performs a cell reselection through a first SIM card among the plurality of SIM cards to obtain a cell reselection result. Additionally, the method includes that the terminal sends the cell reselection result from the first SIM card to a second SIM card among the plurality of SIM cards. Furthermore, the terminal takes a cell indicated by the cell reselection result as a new cell in which the second SIM card is to reside.

According to a second aspect of the present disclosure, there is provided a computer-readable storage medium having a computer program stored, where the computer program is configured to execute the cell reselection methods described in the first aspect.

According to a third aspect of the present disclosure, there is provided a cell reselection apparatus. The apparatus is applicable to a terminal supporting a plurality of subscriber identification module (SIM) cards, and includes one or more processors; and a memory for storing instructions executable by the one or more processors.

The one or more processors are configured to: perform a cell reselection through a first SIM card among the plurality of SIM cards to obtain a cell reselection result; send the cell reselection result from the first SIM card to a second SIM card among the plurality of SIM cards; and take a cell indicated by the cell reselection result as a new cell in which the second SIM card is to reside.

The technical solutions provided according to the present disclosure may obtain the following beneficial effects.

In one or more embodiments of the present disclosure, a terminal supporting a plurality of SIM cards can perform a cell reselection through a first SIM card, and send a cell reselection result to a second SIM card. The second SIM card can no longer undergo the cell reselection, and a cell, which is indicated by the cell reselection result sent from the first SIM card, can be directly taken as a new cell in which the second SIM card is to reside. Through the above process, the terminal supporting the plurality of SIM cards can perform the cell reselection through only one SIM card. For other SIM cards, they can no longer undergo the cell reselection separately, but directly adopt the cell indicated by the cell reselection result of the one SIM card as their own new cell to be resided in, thereby saving terminal power.

In one or more embodiments of the present disclosure, the first SIM card and the second SIM card are expected to belong to one operator and be both idle, thereby it has high availability.

In one or more embodiments of the present disclosure, alternatively or additionally, the first SIM card can be any one of the plurality of SIM cards, and the second SIM card can be at least one of other SIM cards that are different from the first SIM card. Correspondingly, when the cell reselection of the first SIM card is performed, a notification message can be sent from the first SIM card to the second SIM card to inform the second SIM card that the first SIM card itself is undergoing the cell reselection. Thus, the second SIM card can no longer undergo the cell reselection, but wait for the completion of the cell reselection of the first SIM card. After the cell reselection of the first SIM card is complete, the cell indicated by the cell reselection result of the first SIM card is taken as the new cell in which the second SIM card is to reside, which avoids such a problem that the terminal power is consumed due to the separate cell reselections of the plurality of SIM cards.

In one or more embodiments of the present disclosure, alternatively or additionally, among the plurality of SIM cards, the first SIM card can belong to a preset SIM card, and the second SIM card can be at least one of other SIM cards that do not belong to the preset SIM card. In one or more embodiments of the present disclosure, it can only allow the first SIM card belonging to the preset SIM card to undergo the cell reselection, and prohibit the second SIM card from undergoing the cell reselection, which can also achieve the purpose of saving terminal power.

In one or more embodiments of the present disclosure, alternatively or additionally, a SIM card among the plurality of SIM cards which is set in a pre-designated card slot can be taken as the first SIM card belonging to the preset SIM card, or the first SIM card belonging to the preset SIM card can be selected by a user from an identifier list including SIM card identifiers corresponding respectively to the plurality of SIM cards. It is easy to be implemented and has high availability.

It should be understood that the above general description and the following detailed description are only exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
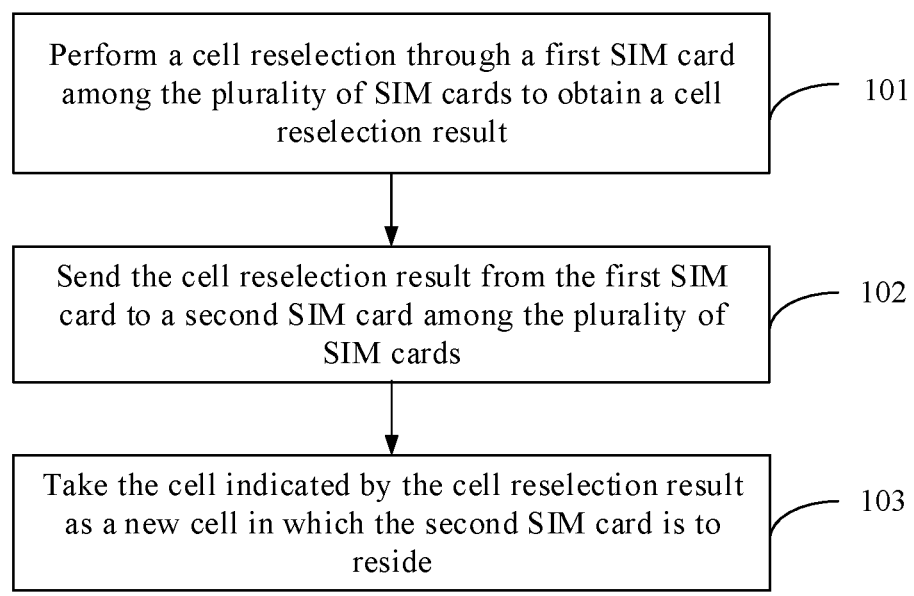
FIG. 1 is a schematic flowchart illustrating a cell reselection method according to an example.

Exemplary embodiments will be described in detail here with the examples thereof expressed in the drawings. Where the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when", "upon", or "in response to determining".

Some examples of the present disclosure provide a cell reselection method, which is applicable to a terminal supporting a plurality of subscriber identification module (SIM) cards. In the examples of the present disclosure, the first SIM card and the second SIM card should belong to one operator. In addition, both the first SIM card and the second SIM card should be idle state and be expected to reselect and reside in a new cell.

As illustrated in FIG. 1 which is a flowchart of a cell reselection method according to an example, the method may include the following steps.

At step 101, a cell reselection is performed through a first SIM card among the plurality of SIM cards to obtain a cell reselection result.

In this step, it may allow the first SIM card among the plurality of SIM cards supported by the terminal to undergo the cell reselection, so as to obtain the cell reselection result. In one or more examples, the cell reselection result may include at least a cell identifier of a new cell in which the first SIM card is to reside.

At step 102, the cell reselection result is sent from the first SIM card to a second SIM card among the plurality of SIM cards.

In this step, after the first SIM card determines its own cell reselection result, this result may be sent to the second SIM card among the plurality of SIM cards that is different from the first SIM card.

At step 103, the cell indicated by the cell reselection result is taken as a new cell in which the second SIM card is to reside.

In this step, the second SIM card is not to undergo the cell reselection, and may directly adopt the cell reselection result of the first SIM card as its own cell reselection result. That is, the second SIM card adopts the cell indicated by the cell reselection result of the first SIM card as its own new cell to be resided in.

Through the above example, the terminal supporting the plurality of SIM cards can perform the cell reselection through only one SIM card. For other SIM cards, they can no longer undergo the cell reselection separately, but directly adopt the cell indicated by the cell reselection result of the one SIM card as their own new cell to be resided in, thereby saving terminal power.

In an example, the first SIM card undergoing the cell reselection may be any one idle SIM card among the plurality of SIM cards. Correspondingly, the second SIM card may be any one of other SIM cards that belong to the same operator as the first SIM card and are also idle.

For example, the terminal may perform the cell reselection through SIM card #1, and SIM card #2 directly adopts the cell reselection result of SIM card #1 as its own cell reselection result.

Conversely, the cell reselection may also be performed through SIM card #2, and SIM card #1 directly adopts the cell reselection result of SIM card #2 as its own cell reselection result.

Figure 2:
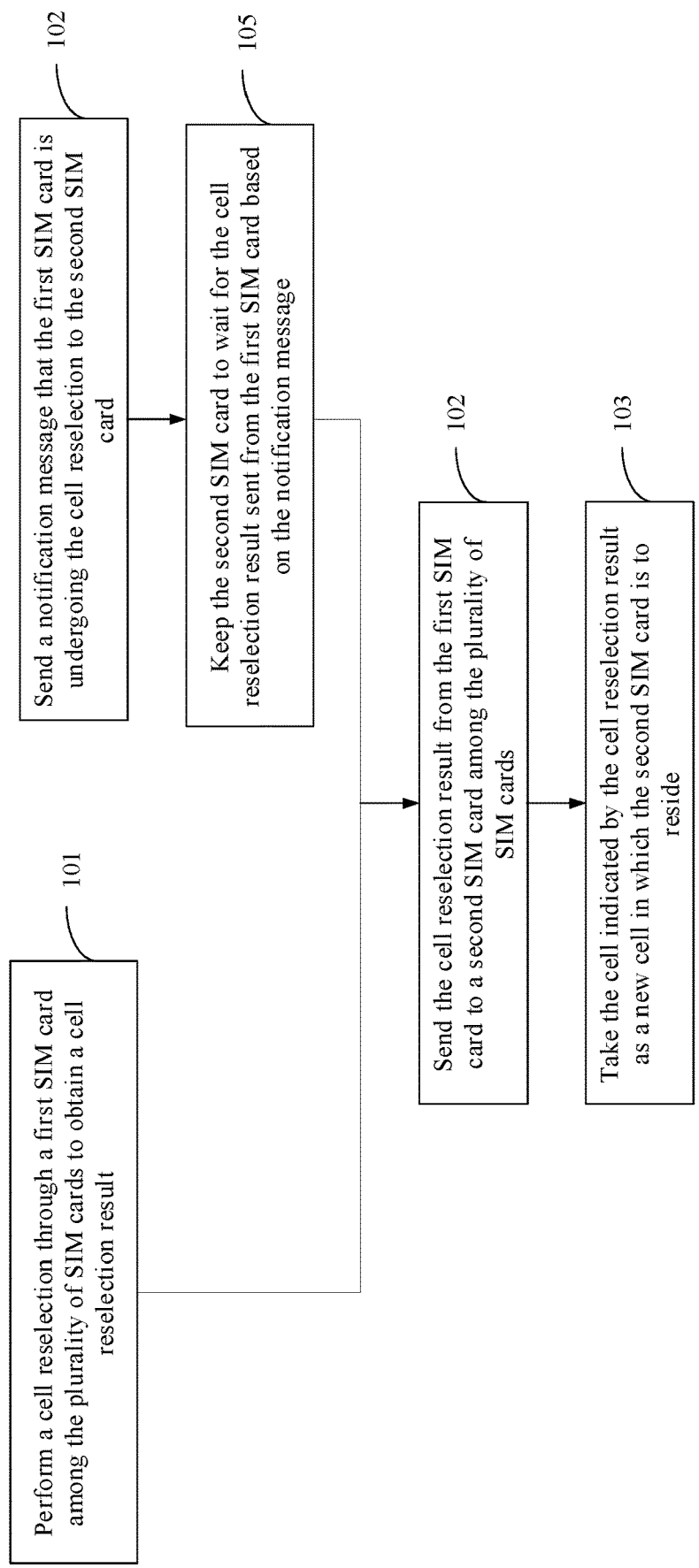
FIG. 2 is a schematic flowchart illustrating another cell reselection method according to an example.

In an example, as illustrated in FIG. 2 which is a flowchart of another cell reselection method on the basis of the example illustrated in FIG. 1, when the cell reselection is performed through the first SIM card among the plurality of SIM cards, the method further includes the following steps.

At step 104, a notification message that the first SIM card is undergoing the cell reselection is sent to the second SIM card.

In this step, when the first SIM card undergoes the cell reselection, the notification message may be sent to the second SIM card, so as to inform the second SIM card that the first SIM card is undergoing the cell reselection, thereby avoiding the second SIM card from undergoing the cell reselection.

At step 105, the second SIM card is kept to wait for the cell reselection result sent from the first SIM card based on the notification message.

In this step, once receiving the notification message, the second SIM card no longer undergoes the cell reselection, but waits for the cell reselection result sent from the first SIM card based on the notification message.

In the above example, when the first SIM card undergoes the cell reselection, the notification message may be sent from the first SIM card to the second SIM card, so as to inform the second SIM card that the first SIM card itself is undergoing the cell reselection. Thus, the second SIM card is no longer to undergo the cell reselection, but wait for the completion of the cell reselection of the first SIM card. After the cell reselection of the first SIM card is complete, the cell indicated by the cell reselection result of the first SIM card is taken as the new cell in which the second SIM card is to reside, which avoids such a problem that the terminal power is consumed due to the separate cell reselections of the plurality of SIM cards.

In an example, the first SIM card undergoing the cell reselection may belong to a preset SIM card among the plurality of SIM cards. For example, a preset SIM card is a Main card, and the terminal only perform the cell reselection for the first SIM card being the Main card. The second SIM card is at least one SIM card that does not belong to the preset SIM card among the plurality of SIM cards. For example, as being a Secondary card, the second SIM card cannot undergo the cell reselection, but may adopt the cell reselection result of the Main card as its own cell reselection result.

In an example, the terminal may automatically determine, among the plurality of SIM cards, the first SIM card belonging to the preset SIM card.

In one or more examples, the terminal may directly take a SIM card among the plurality of SIM cards, which is set in a pre-designated card slot, as the first SIM card belonging to the preset SIM card.

For example, SIM card #1, SIM card #2, and SIM card #3 are set in card slot #1, card slot #2, and card slot #3, respectively. Card slot #1 is the pre-designated card slot, and thus the terminal directly determines SIM card #1 as the preset SIM card and performs the cell reselection through only SIM card #1.

In the foregoing examples, the SIM card set in the pre-designated card slots among the plurality of SIM cards may be taken as the first SIM card belonging to the preset SIM card. It is easy to be implemented and has high availability.

Figure 3:
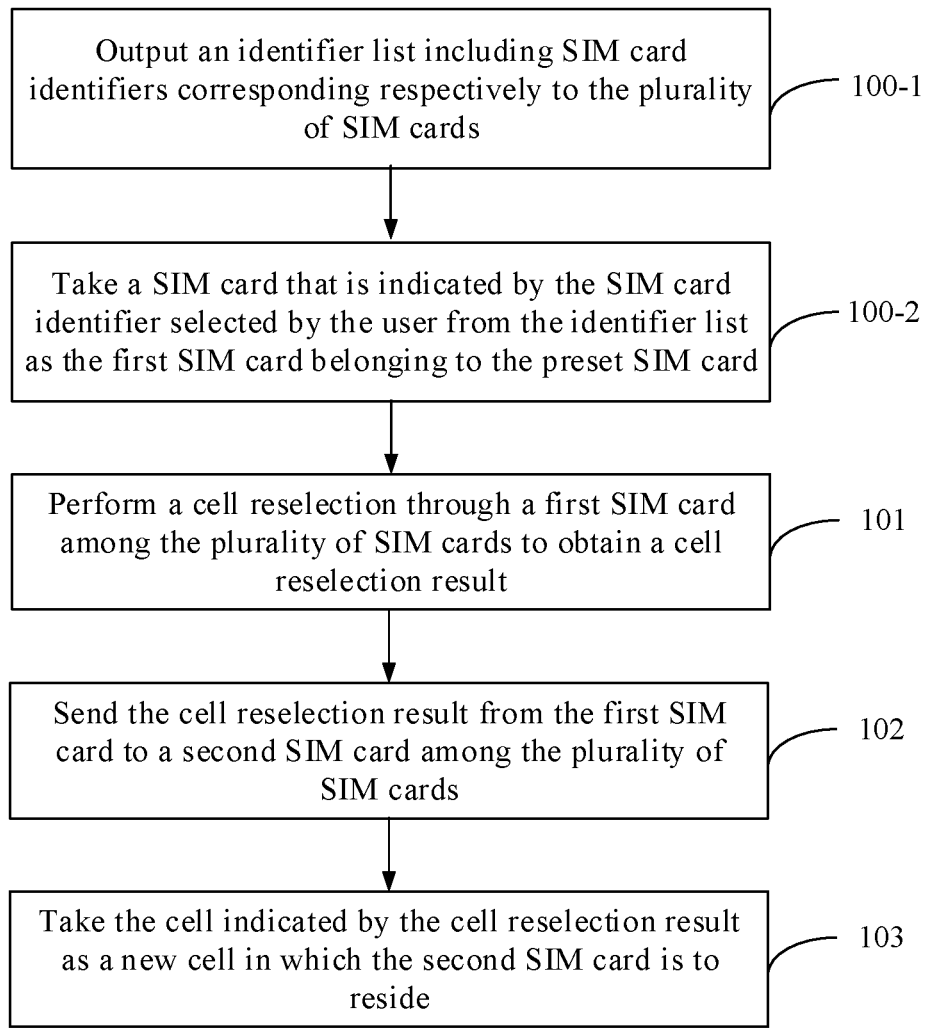
FIG. 3 is a schematic flowchart illustrating another cell reselection method according to an example.

In an example, the first SIM card belonging to the preset SIM card may also be determined by a user. Referring to FIG. 3 which is a flowchart of another cell reselection method on the basis of the example illustrated in FIG. 1, a process that the first SIM card belonging to the preset SIM card is determined among the plurality of SIM cards may include the following steps.

At step 100-1, an identifier list including SIM card identifiers corresponding respectively to the plurality of SIM cards is outputted.

In this step, the terminal may first output the identifier list, which includes the SIM card identifiers corresponding respectively to the plurality of SIM cards.

At step 100-2, a SIM card that is indicated by the SIM card identifier selected by the user from the identifier list is taken as the first SIM card belonging to the preset SIM card.

In this step, the user may select the first SIM card being the preset SIM card from the identifier list. Assuming that the user selects SIM card #2, the terminal takes SIM card #2 as the first SIM card belonging to the preset SIM card, and other SIM cards may automatically become the second SIM cards.

In the foregoing example, the first SIM card belonging to the preset SIM card may be selected by the user from the identifier list including the SIM card identifiers corresponding respectively to the plurality of SIM cards. It is easy to be implemented and has high availability.

Corresponding to the foregoing method examples for implementing various application functions, the present disclosure also provides apparatus examples for implementing various application functions and relevant terminal examples.

Figure 4:
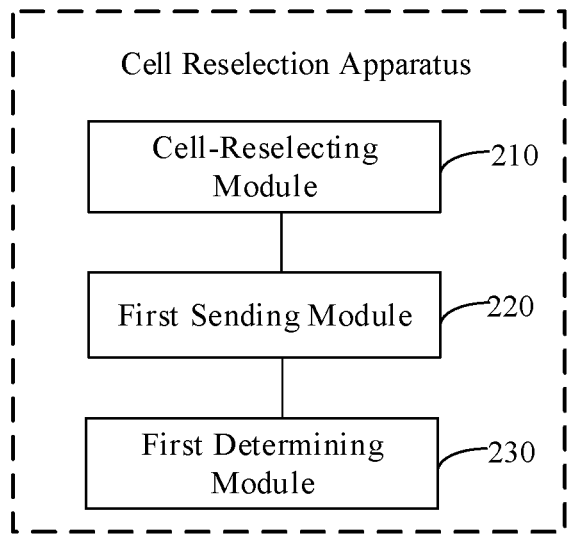
FIG. 4 is a block diagram illustrating a cell reselection apparatus according to an example.

Referring to FIG. 4 which is a block diagram of a cell reselection apparatus according to an example, the apparatus is applicable to a terminal supporting a plurality of subscriber identification module (SIM) cards, and includes:

a cell-reselecting module 210, configured to perform a cell reselection through a first SIM card among the plurality of SIM cards to obtain a cell reselection result;

a first sending module 220, configured to send the cell reselection result from the first SIM card to a second SIM card among the plurality of SIM cards; and a first determining module 230, configured to take a cell indicated by the cell reselection result as a new cell in which the second SIM card is to reside.

In one or more examples, the first SIM card and the second SIM card belong to one operator and are both idle.

In one or more examples, the first SIM card is any one of the plurality of SIM cards; and the second SIM card is at least one of other SIM cards that are different from the first SIM card among the plurality of SIM cards.

Figure 5:
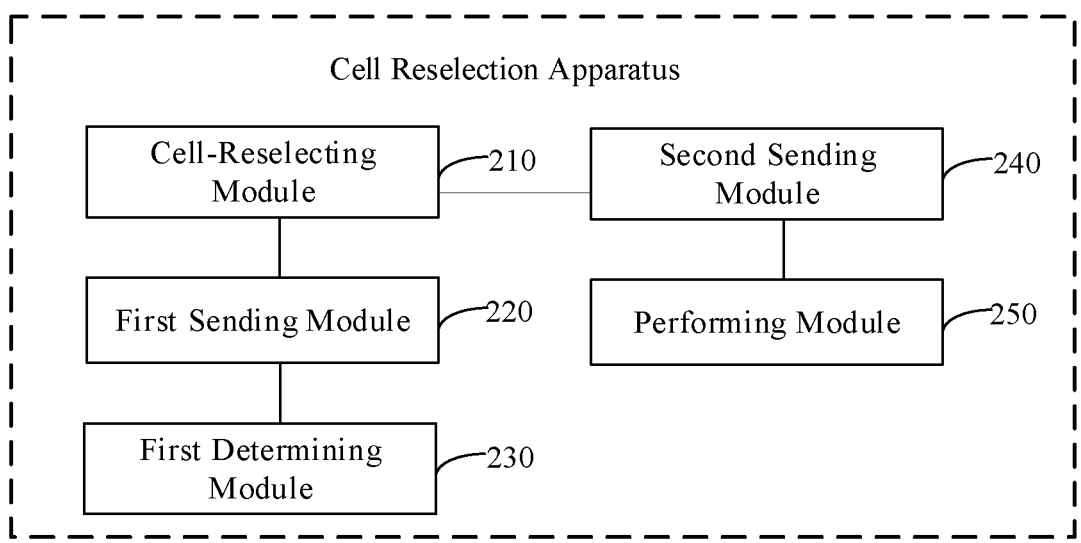
FIG. 5 is a block diagram illustrating another cell reselection apparatus according to an example.

Referring to FIG. 5 which is a block diagram of another cell reselection apparatus on the basis of the example illustrated in FIG. 4, the apparatus further includes:

a second sending module 240, configured to send a notification message that the first SIM card is undergoing the cell reselection to the second SIM card; and a performing module 250, configured to keep, based on the notification message, the second SIM card to wait for the cell reselection result sent from the first SIM card.

In one or more examples, the first SIM card is a SIM card which belongs to a preset SIM card among the plurality of SIM cards; and the second SIM card is at least one SIM card that does not belong to the preset SIM card among the plurality of SIM cards.

Figure 6:
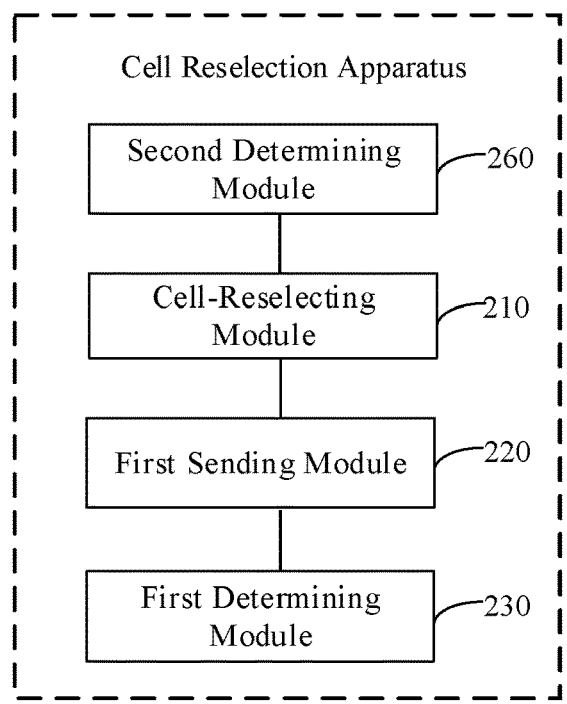
FIG. 6 is a block diagram illustrating another cell reselection apparatus according to an example.

Referring to FIG. 6 which is a block diagram of another cell reselection apparatus on the basis of the example illustrated in FIG. 4, the apparatus further includes:

a second determining module 260, configured to take a SIM card among the plurality of SIM cards, which is set in a pre-designated card slot, as the first SIM card belonging to the preset SIM card.

Figure 7:
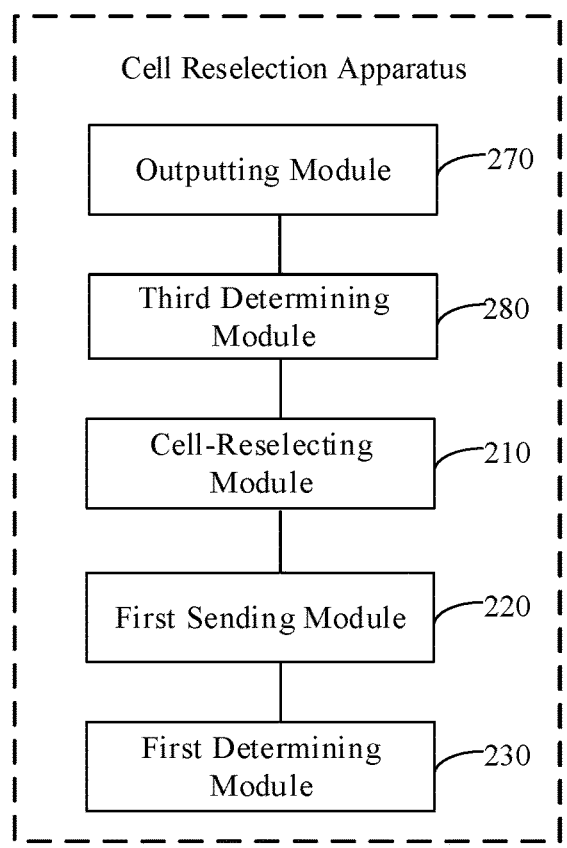
FIG. 7 is a block diagram illustrating another cell reselection apparatus according to an example.

Referring to FIG. 7 which is a block diagram of another cell reselection apparatus on the basis of the example illustrated in FIG. 4, the apparatus further includes:

an outputting module 270, configured to output an identifier list including SIM card identifiers corresponding respectively to the plurality of SIM cards; and a third determining module 280, configured to take a SIM card, which is indicated by the SIM card identifier selected by a user from the identifier list, as the first SIM card belonging to the preset SIM card.

Since the apparatus examples essentially correspond to the method examples, reference may be made to the description of related parts of the method examples. The apparatus examples described above are merely illustrative, where the units described as separate components may or may not be physically separated, and the components displayed as units may or may not be physical units, that is, may be located in one place or distributed to multiple units in a network. Some or all of the modules may be selected according to actual needs to achieve the objectives of the present disclosure. It can be understood and implemented by those of ordinary skill in the art without any creative effort.

Correspondingly, the present disclosure also provides a computer-readable storage medium having a computer program stored. The computer program is configured to execute any one of the cell reselection methods described above.

Correspondingly, the present disclosure also provides a cell reselection apparatus, which is applicable to a terminal supporting a plurality of subscriber identification module (SIM) cards, and includes:

one or more processors; and a memory for storing instructions executable by the one or more processors.

The one or more processors are configured to:

perform a cell reselection through a first SIM card among the plurality of SIM cards to obtain a cell reselection result;

send the cell reselection result from the first SIM card to a second SIM card among the plurality of SIM cards; and take a cell indicated by the cell reselection result as a new cell in which the second SIM card is to reside.

Figure 8:
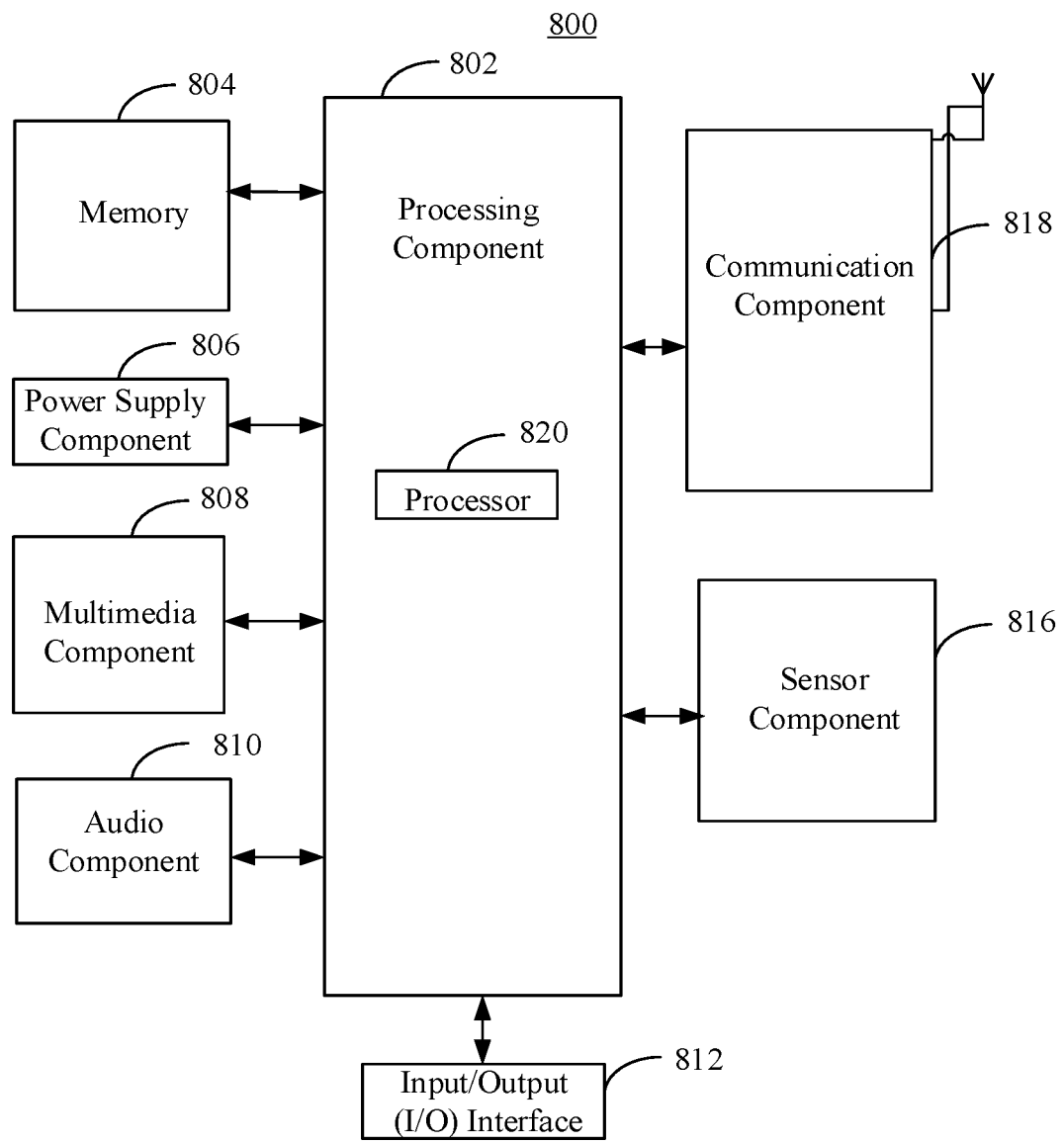
FIG. 8 is a schematic structural diagram illustrating a cell reselection apparatus according to an example of the present disclosure.

FIG. 8 is a block diagram of an electronic device 1000 supporting a plurality of SIM cards according to an example. For example, the electronic device 800 may be a terminal such as a mobile phone, a tablet computer, an e-book reader, a multimedia playback device, a wearable device, and a vehicle-mounted terminal.

Referring to FIG. 8, the electronic device 800 may include one or more of the following components: a processing component 802, a memory 804, a power supply component 806, a multimedia component 808, an audio component 810, an input/output (I/O) interface 812, a sensor component 816, and a communication component 818.

The processing component 802 generally controls the overall operations of the electronic device 800, such as operations associated with display, phone calls, data communications, camera operations, and recording operations. The processing element 802 may include one or more processors 820 to execute instructions to complete all or part of the steps of the above methods. In addition, the processing component 802 may include one or more modules which facilitate the interaction between the processing component 802 and other components. For example, the processing component 802 may include a multimedia module to facilitate the interaction between the multimedia component 808 and the processing component 802. For another example, the processing component 802 may read executable instructions from the memory to implement the steps of a cell reselection method provided in the foregoing examples.

The memory 804 is configured to store various types of data to support the operation of the electronic device 800. Examples of such data include instructions for any application or method operated on the electronic device 800, contact data, phonebook data, messages, pictures, videos, and the like. The memory 804 may be implemented by any type of volatile or non-volatile storage device or a combination thereof, such as static random access memory (SRAM), electrically erasable programmable read only memory (EEPROM), erasable programmable Read Only Memory (EPROM), programmable Read Only Memory (PROM), Read Only Memory (ROM), Magnetic Memory, Flash Memory, Disk or Optical Disk.

The power supply component 806 provides power for various components of the electronic device 800. The power supply component 806 may include a power management system, one or more power supplies, and other components associated with generating, managing, and distributing power for the electronic device 800.

The multimedia component 808 includes a display screen that provides an output interface between the electronic device 800 and the user. In some examples, the multimedia component 808 includes a front camera and/or a rear camera. The front camera and/or rear camera may receive external multimedia data when the electronic device 800 is in an operating mode, such as a photographing mode or a video mode. Each front camera and rear camera may be a fixed optical lens system or have focal length and optical zooming capability.

The audio component 810 is configured to output and/or input an audio signal. For example, the audio component 810 includes a microphone (MIC) that is configured to receive an external audio signal when the electronic device 800 is in an operating mode, such as a call mode, a recording mode, and a voice recognition mode. The received audio signal may be further stored in the memory 804 or sent via the communication component 818. In some examples, the audio component 810 also includes a speaker for outputting an audio signal.

The I/O interface 812 provides an interface between the processing component 802 and a peripheral interface module. The above peripheral interface module may be a keyboard, a click wheel, buttons, or the like. These buttons may include but not limited to, a home button, a volume button, a start button and a lock button.

The sensor component 816 includes one or more sensors to provide status assessments of various aspects for the electronic device 800. For example, the sensor component 816 may detect an open/closed state of the electronic device 800 and a relative positioning of components such as the display and keypad of the electronic device 800, and the sensor component 816 may also detect a change in position of the electronic device 800 or a component of the electronic device 800, the presence or absence of user contact with the electronic device 800, orientation or acceleration/deceleration of the electronic device 800, and temperature change of the electronic device 800. The sensor component 816 may include a proximity sensor configured to detect the presence of a nearby object without any physical contact. The sensor component 816 may further include an optical sensor, such as a Complementary Metal-Oxide-Semiconductor (CMOS) or Charged Coupled Device (CCD) image sensor which is used in imaging applications. In some examples, the sensor component 816 may also include an acceleration sensor, a gyro sensor, a magnetic sensor, a pressure sensor, or a temperature sensor.

The communication component 818 is configured to facilitate wired or wireless communication between the electronic device 800 and other devices. The electronic device 800 may access a wireless network based on a communication standard, such as Wi-Fi, 2G or 3G, 4G, 5G, or a combination thereof. In an example, the communication component 818 receives broadcast signals or broadcast related information from an external broadcast management system via a broadcast channel. In an example, the communication component 818 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In one or more examples, the electronic device 800 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In one or more examples, there is also provided a non-transitory computer-readable storage medium including instructions, such as the memory 804 including instructions executable by the one or more processors 820 of the electronic device 800 to implement the above cell reselection methods. For example, the non-transitory computer-readable storage medium may be a Read-Only Memory (ROM), a Random Access Memory (RAM), a CD-ROM, a magnetic tape, a floppy disk, an optical data storage device, and the like.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The specification and examples therein are only illustrative.

It should be understood that the present disclosure is not limited to the above described accurate structures illustrated in the drawings, and various modifications and changes can be made to the present disclosure without departing from the scope thereof.

The invention claimed is:

1. A cell reselection method, comprising:
performing, by a terminal supporting a plurality of subscriber identification module (SIM) cards, a cell reselection through a first SIM card among the plurality of SIM cards to obtain a cell reselection result, wherein the first SIM card and a second SIM card belong to one operator and are both idle, and wherein the first SIM card is a SIM card which belongs to a preset SIM card among the plurality of SIM cards; and
the second SIM card is at least one SIM card that does not belong to the preset SIM card among the plurality of SIM cards;
sending a notification message that the first SIM card is undergoing the cell reselection to the second SIM card;
keeping, based on the notification message, the second SIM card to wait for the cell reselection result sent from the first SIM card;
sending, by the terminal, the cell reselection result from the first SIM card to a second SIM card among the plurality of SIM cards; and
taking, by the terminal, a cell indicated by the cell reselection result as a new cell in which the second SIM card is to reside;
wherein the first SIM card belonging to the preset SIM card is determined among the plurality of SIM cards, which comprises:
outputting an identifier list comprising SIM card identifiers corresponding respectively to the plurality of SIM cards; and
taking a SIM card, which is indicated by the SIM card identifier selected by a user from the identifier list, as the first SIM card belonging to the preset SIM card.

2. The method according to claim 1, wherein the first SIM card belonging to the preset SIM card is determined among the plurality of SIM cards, which comprises:
taking a SIM card among the plurality of SIM cards, which is set in a pre-designated card slot, as the first SIM card belonging to the preset SIM card.

3. A non-transitory computer-readable storage medium having a computer program stored, wherein the computer program is configured to execute the cell reselection method according to claim 1.

4. A cell reselection apparatus, being applicable to a terminal supporting a plurality of subscriber identification module (SIM) cards, comprising:
one or more processors; and
a memory for storing instructions executable by the one or more processors;
wherein the one or more processors are configured to:
perform a cell reselection through a first SIM card among the plurality of SIM cards to obtain a cell reselection result, wherein the first SIM card and a second SIM card belong to one operator and are both idle, and wherein the first SIM card is a SIM card which belongs to a preset SIM card among the plurality of SIM cards; and
the second SIM card is at least one SIM card that does not belong to the preset SIM card among the plurality of SIM cards;
send a notification message that the first SIM card is undergoing the cell reselection to the second SIM card;

keep, based on the notification message, the second SIM card to wait for the cell reselection result sent from the first SIM card;

send the cell reselection result from the first SIM card to a second SIM card among the plurality of SIM cards; and take a cell indicated by the cell reselection result as a new cell in which the second SIM card is to reside;

wherein the one or more processors are further configured to determine the first SIM card belonging to the preset SIM card range among the plurality of SIM cards, which comprises that the one or more processors are configured to:

output an identifier list comprising SIM card identifiers corresponding respectively to the plurality of SIM cards; and take a SIM card, which is indicated by the SIM card identifier selected by a user from the identifier list, as the first SIM card belonging to the preset SIM card.

5. The apparatus according to claim 4, wherein the one or more processors are further configured to determine the first SIM card belonging to the preset SIM card range among the plurality of SIM cards, which comprises that the one or more processors are configured to:

take a SIM card among the plurality of SIM cards, which is set in a pre-designated card slot, as the first SIM card belonging to the preset SIM card.

\* \* \* \* \*